United States Patent [19]

Hennenfent et al.

[11] 4,006,525
[45] Feb. 8, 1977

[54] METHOD OF MACHINING VISE JAW FACE

[75] Inventors: Douglas J. Hennenfent, Minneapolis; Robert A. Johnson, Minnetonka; Raymond Eino Jutila, Wayzata, all of Minn.

[73] Assignee: Control Data Corporation, Minneapolis, Minn.

[22] Filed: Apr. 8, 1976

[21] Appl. No.: 675,092

Related U.S. Application Data

[62] Division of Ser. No. 526,555, Nov. 25, 1974, Pat. No. 3,951,395.

[52] U.S. Cl. .............................. 29/558; 29/DIG. 26
[51] Int. Cl.² ......................................... B23P 13/04
[58] Field of Search ............ 29/557, 558, DIG. 25, 29/DIG. 26; 269/265–270, 273, 275, 296, 253, 8

[56] References Cited

UNITED STATES PATENTS

| | | | |
|---|---|---|---|
| 2,252,276 | 8/1941 | Steiner et al. | 29/DIG. 26 |
| 3,090,614 | 5/1963 | Freeman et al. | 269/273 |
| 3,315,637 | 4/1967 | Taylor | 269/296 X |

FOREIGN PATENTS OR APPLICATIONS

| | | | |
|---|---|---|---|
| 187,753 | 11/1936 | Switzerland | 29/DIG. 26 |

*Primary Examiner*—Victor A. DiPalma
*Attorney, Agent, or Firm*—Edward L. Schwarz

[57] ABSTRACT

An article and a method for manufacturing the same, for use as a jaw face of a vise and which applies pressure evenly along any approximately flat surface clamped therein. The face comprises a plurality of cantilevered beams integral with the body of the jaw. The beams are spaced apart from each other and in the preferred embodiment have along a corresponding exterior surface of each, a pair of projections the tips of which are tangent to a geometrically flat plane. When the jaw is used, the projections bear against a flat surface of the workpiece to be clamped and the individual beams deflect slightly to correct for deviations from flatness in the flat surface, thereby assuring that the clamping force is distributed relatively evenly along the surface. A preferred method for manufacturing this article comprises the making of a plurality of cuts perpendicular to the jaw face of a block, which carries the projections. A second slot is cut to completely intersect each first slot, cutting the entire breadth of a first side intersecting the jaw face, and extending partially toward a second side opposing the first and also intersecting the jaw face. If more deflection is required, a third slot similar to the second but cutting the entire breadth of the second side and extending toward the first side in spaced relation to the second slot may be cut.

4 Claims, 2 Drawing Figures

METHOD OF MACHINING VISE JAW FACE

This is a division of application Ser. No. 526,555, filed Nov. 25, 1974, now U.S. Pat. No. 3,951,395.

BACKGROUND OF THE INVENTION

1. Field of the Invention

In certain manufacturing operations, it is necessary to apply pressure evenly along a flat or nearly flat surface. In particular, the problem arises when bonding bars of ferrite material together to form a composite bar from which individual ferrite heads for use in magnetic recording are sawed. In such applications, tolerances are extremely tight, as little as ±5 micro-inches in the spacing between the bars which are bonded together, said spacing forming the flux gaps for the cores. These tolerances must be accurately maintained along a relatively long interface, since many cores are sawed from a single bar. Of course, the aforementioned even clamping pressure on the individual bars must be maintained throughout the bonding operation.

The problem is complicated by several factors. Even though many individual cores are sawed from the composite bar, the bar itself is still quite small and difficult to work with. It is made from ferrite, an extremely hard material which is not easy to accurately machine over large areas to true flatness. Thus, minor deviations from true flatness are inevitable along the mating surfaces of the individual bars to be bonded together. An even more serious problem, however, is that the bonding takes place at elevated temperatures, temperatures at which metals normally lose much of their strength and often even melt. Thus, it is imperative that the vise which clamps the individual bars together to permit bonding be unaffected by elevated temperatures so as to permit the bonding to result in accurate widths of the bonding material along the bonding interface.

2. Description of the Prior Art

An ordinary flat or grooved jaw face in such a vise is not satisfactory because of the unavoidable deviations from the flatness in the individual ferrite bars. The usual solution is to have individual jaw face parts which will adjust or deflect responsive to load variations across the face as the vise jaws are tightened. The closest art of which inventors are aware is shown by U.S. Pat. No. 3,561,748, which discloses a vise having jaws comprising fingers forming an acute angle with the jaw face, and which deflect a small amount elastically when the vice is tightened on a work piece. Applicants consider this patent to be the closest art of which they are aware. U.S. Pat. No. 988,820 discloses a clamping structure having porcelain jaws, a refractory material such as forms a part of the invention of this application. The prior art includes many other U.S. Patents whose jaws comprise individually adjustable segments, such as those shown in U.S. Pat. Nos. 1,453,176; 1,519,225; 2,658,415; 2,754,708; 3,592,461; and 3,608,809. Applicants feel that none of these devices alone or in combination are suitable for the purposes served by the instant invention.

BRIEF DESCRIPTION OF THE INVENTION

The preferred solution to this problem is a vise jaw made of a refractory material such as alumina, able to resist high temperatures and still provide a slightly flexible bearing face able to contour itself to the inevitable small deviations from true flatness in the individual workpiece surfaces. A face having such characteristics comprises a plurality of identical cantilevered beams precisely aligned in a side by side fashion and attached to a jaw body. The similar, exteriorly facing surfaces of the beams form the face of the jaw. The exterior surfaces of the beams forming the jaw face may have projections whose ends are all precisely tangent to a flat geometric plane when none of the arms are stressed, and thus contact only a small area of the flat workpiece surface. For compactness, if simple cantilevered beams do not furnish sufficient flexibility, the beam can have two L-shaped portions with the longer arm of one portion facing the longer arm of the other L across a narrow slot separating the two longer arms. It is preferrble that the beams comprising the bearing face be integral with the jaw body.

A preferred method for manufacturing such a jaw is to first machine a block into the outline of the jaw, with the face accurately machined and having the contact projections correctly located. The individual beams are formed by cutting parallel slots completely across the jaw face deeply enough into the jaw to form the facing sides of the beams. These slots cut part way through first and second exterior jaw surfaces intersecting opposite edges of the jaw face. Then a slot intersecting each of the previously cut parallel slots and cutting completely across the breadth of the first surface and extending part way toward the opposite (second) surface is cut. For the two-L-shaped-arm configuration, a second cut is made, spaced apart from the cut intersecting the first jaw surface, extending completely across the second surface end extending part way toward the first surface. This frees all four sides of the beams and produces the two-L-shaped-arm configuration.

Accordingly, one object is to provide a jaw face capable of minor deflections in accommodating its gripping face to a surface deviating slightly from ideal flatness.

A second object is to achieve extreme accuracy in the dimensions of the face itself, permitting more accurate distribution of clamping pressure along the almost flat surface to be clamped.

Still another object is to permit clamping of objects at elevated temperatures without appreciable change of clamping pressure.

Yet another object is to permit easy and inexpensive fabrication of such a jaw.

Other objects and purposes of the invention will become apparent in the detailed description which follows.

DESCRIPTION OF THE PREFERRED EMBODIMENTS

Figure 1:
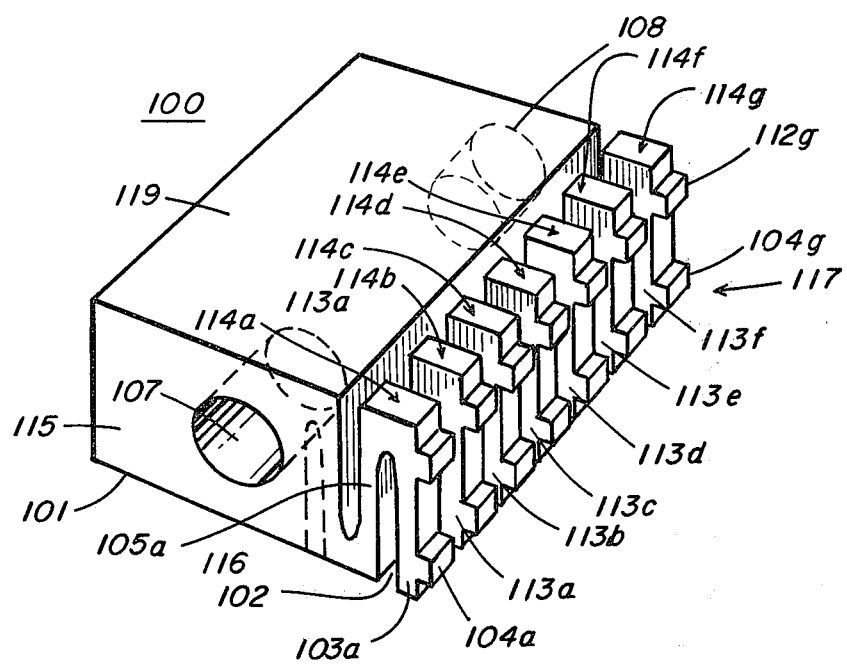
FIG. 1 is a perspective drawing of a preferred embodiment of the invention.

FIG. 1 discloses a perspective image of a preferred embodiment of jaw 100 having its gripping or bearing face 117 facing generally to the right. Base 101 contains mounting holes 107 and 108 by which the jaw may be attached to a vise arm. Beams 114a–114g in combination forming bearing face 117, are preferrably integral with body 101. A typical beam 114a comprises a first L-shaped arm 105a defined by slots 106, 102, and 113a, and surface 115 of jaw 100. L-shaped arm 103a is integral with L-shaped arm 105a and defined by slot 102, face 117 of jaw 100, slot 113a, and surface 115. Projections 112a–112g and 104 a–104g are intended to press firmly against the flat or nearly flat surface which is to be clamped. Slots 106 and 102 are shown as having parallel sides but this is of course not necessary. For even clamping pressure it is necessary that each beam 114a–114g be nearly identical geometrically and dimensionally so as to have very nearly the same spring rate and thus apply nearly identical pressure against the flat surface to be clamped. Beams 114b–114f are defined in almost the identical manner that is beam 114a, except that the sides of their arms 105b–105g and 103b–103g are defined by slots 113a–113f and the surface (not visible) opposing surface 115. Load-bearing projections 112a and 104a and similar projections on beams 114b–114g should all have identical heights from the flat faces of which they are integral. Thus, the tips of the projections are all tangent to a selected plane which is substantially parallel to the flat-surfaced part of beams 114a–114g. For high temperature use, jaw 100 is preferrably formed from a refractory material having substantial tensile strength, such as alumina.

In use, jaw 100 is attached to a load-applying member of a vise or clamp by holes 107 and 108 so that projections 112a–112g and 104a–104g bear against the correctly positioned flat surface of the workpiece to be clamped. As load is applied by the vise member to jaw 100, beams 114a–114g will deflect slightly. Since in general every such workpiece surface to be clamped deviates slightly from true flatness, the deflection of those beams 114a–114g first contacting the surface allows those arms not contacting the surface at first to soon take up part of the clamping load and thus distribute the force relatively evenly along the surface to be clamped. If no projections 104a–104g and 112a–112g are present, it is likely that some portions of each individual face of beams 114a–114g will not contact the surface to be clamped.

It should be understood that very little deflection of beams 114a–114g is contemplated, perhaps on the order of 0.001 inch. For deflections on this order with the design shown, slots 106 and 102 may typically be 0.25 inch deep and arms 103a–103g and 105a–105g be 0.03 inch thick and 0.045 inch wide. It is quite important that the bottom of slots 106 and 102 be rounded, so as to prevent stress concentrations and possible failure of the material at these points.

There are of course many variations on the preferred article displayed. Although seven beams 114a–114g are shown, any convenient number, 15, 20, or more can be as easily employed. If more stiffness in beams 114a–114g is required, slot 106 need not be cut, and therefore arms 103a and those analogous will furnish the entire flexing which occurs. If less stiffness is desired, slot 116 can be cut, and slots 113a–113f in jaw 100 be deepened, to create a third arm in each beam 114a–114g which will furnish additional flexing. In design, slots 102 and 106 are approximately parallel to each other, although this is not necessary. The walls of slots 102, 106 and 113a–113f are shown to be parallel but this also is not necessary. However ease of manufacturing will probably dictate that such slot walls be made parallel. For most applications it is essential that each beam 114a–114g deflect identical amounts for identical loads. This condition can be most easily achieved by making beams 114a–114g geometrically and dimensionally identical. If particular applications require differing pressures along the jaw face, then dimensional variations among beams 114a–114g may be desirable.

Figure 2:
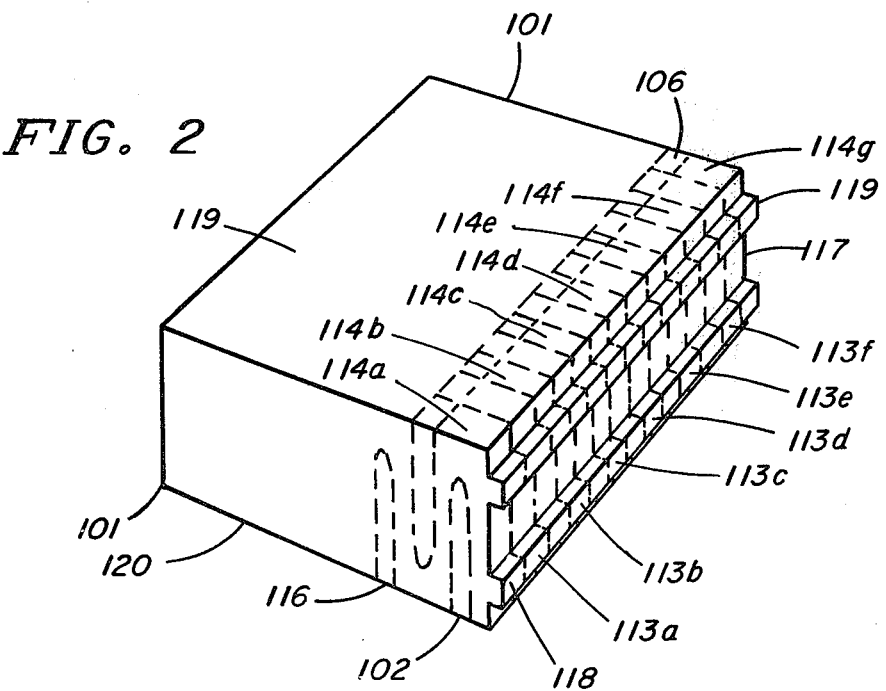
FIG. 2 is a perspective illustrating the method by which the jaw of FIG. 1 may be manufactured.

FIG. 2 discloses the slots which must be cut in a block or prism 101 to define beams 114a–114g. Projections 112a and 104a (FIG. 1) and those similar are created by machining semi-cylindrical projections 118 and 119 along the entire breadth of bearing or gripping face 117. Individual beams 114a–114g are formed by first cutting slots 113a–113f into block 101. The slots 102 and 106 (and 116 if desired) are cut into block 101. It is important that slots 113a–113f reach completely through slot 106. Slot 106 and 102 must both cut completely across the breadth of block 101 from side 119 to side 120 and partially toward the opposing side. The order in which individual cuts are made is unimportant.

Alternative geometries are possible for this article. In FIGS. 1 and 2, slots 113a–113f are shown generally parallel to each other. However, they may be arranged to extend radially from a common center, such as a cylindrical projection. Slot 102 could then be an annular slot extending completely around the perimeter of the cylinder, thereby freeing the L-shaped arms corresponding to arm 103a. A slot corresponding to slot 106 can be created by first boring an axial hole into the cylindrical projection through the gripping face and then using a circular grinding wheel or saw to cut a slot corresponding to slot 106, to add additional flexibility which may be required. Other geometric shapes in addition to those described above are possible as well. These when incorporating the spirit of the teachings above are intended to be included in what we claim:

We claim:
1. A method of manufacturing an improved face for a jaw of a vise intended to apply even pressure along a flat surface, including the steps of
   a. machining first and second opposite exterior sides in a block of refractory material;
   b. machining a gripping face intersecting both the first and second sides of the block along first and second gripping face straight lines of intersection;
   c. cutting a plurality of substantially identical and parallel first slots cutting the entire breadth of the gripping face at equally spaced intervals and extending part way through the block;
   d. cutting a second slot across the entire breadth of the first side along a line parallel to the first gripping face line of intersection, extending part way through the block toward the second side, and intersecting each first slot; and
   e. machining the gripping face adjacent each slot to be tangent at at least one point to a flat plane having a predetermined location adjacent the gripping face.

2. The method of claim 1 comprising the further step of cutting a third slot in the block across the entire breadth of the second side along a line parallel to the second gripping face line of intersection, spaced apart from the second slot, extending part way through the block toward the first side, and intersecting each first slot.

3. The method of claim 2 wherein the first-mentioned step of machining the gripping face includes machining at least one projecting ridge into the gripping face substantially parallel to the first and second sides.

4. The method of claim 3 wherein the steps of machining the second and third slots includes machining them substantially parallel to the plane defined by the first and second gripping face straight lines of intersection.

* * * * *